United States Patent
Trainin et al.

(10) Patent No.: US 9,887,756 B2
(45) Date of Patent: *Feb. 6, 2018

(54) APPARATUS, SYSTEM AND METHOD OF BEAMFORMING

(71) Applicant: INTEL CORPORATION, Santa Clara, CA (US)

(72) Inventors: Solomon B. Trainin, Haifa (IL); Carlos Cordeiro, Portland, OR (US); Assaf Kasher, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,858

(22) Filed: Jun. 19, 2017

(65) Prior Publication Data

US 2017/0288756 A1    Oct. 5, 2017

Related U.S. Application Data

(63) Continuation of application No. 14/583,148, filed on Dec. 25, 2014, now Pat. No. 9,712,221.

(Continued)

(51) Int. Cl.
*H04B 7/06* (2006.01)
*H04W 16/28* (2009.01)
(Continued)

(52) U.S. Cl.
CPC .......... *H04B 7/0617* (2013.01); *H04W 16/28* (2013.01); *H04B 7/0695* (2013.01);
(Continued)

(58) Field of Classification Search
None
See application file for complete search history.

(56) References Cited

U.S. PATENT DOCUMENTS 8,331,265 B2 * 12/2012 Yong .................... H04B 7/0695
370/254
8,422,961 B2 * 4/2013 Kafle ...................... H01Q 3/26
342/368

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Ayaz Sheikh
*Assistant Examiner* — Faiyazkhan Ghafoerkhan
(74) *Attorney, Agent, or Firm* — Shichrur & Co.

(57) ABSTRACT

Some demonstrative embodiments include apparatuses, devices, systems and methods of beamforming. For example, a first station may be configured to transmit to a second station a plurality of sector sweep (SSW) frames of a first beamforming transmission of a beamforming procedure, a SSW frame of the first beamforming transmission including a duration value to indicate a time until at least a beginning of a second beamforming transmission subsequent to the first beamforming transmission; and to receive from the second station one or more SSW frames of the second beamforming transmission.

38 Claims, 7 Drawing Sheets

Related U.S. Application Data

(60) Provisional application No. 62/062,164, filed on Oct. 10, 2014, provisional application No. 62/065,039, filed on Oct. 17, 2014.

(51) Int. Cl.
  *H04W 28/16* (2009.01)
  *H04W 28/06* (2009.01)
  *H04B 7/08* (2006.01)

(52) U.S. Cl.
  CPC ............. *H04B 7/088* (2013.01); *H04W 28/06* (2013.01); *H04W 28/16* (2013.01)

(56) References Cited

U.S. PATENT DOCUMENTS

| | | | | |
|---|---|---|---|---|
| 8,625,565 B2* | 1/2014 | Cordeiro | ............. | H04B 7/0617 370/328 |
| 9,312,985 B2* | 4/2016 | Sanderovich | ......... | H04L 1/0015 |
| 9,712,221 B2 | 7/2017 | Trainin et al. | | |
| 2010/0056062 A1* | 3/2010 | Zhang | ................. | H04B 7/0617 455/63.1 |
| 2010/0214169 A1* | 8/2010 | Kafle | ...................... | H01Q 3/26 342/368 |
| 2010/0265924 A1* | 10/2010 | Yong | ................... | H04B 7/0695 370/336 |
| 2011/0080898 A1* | 4/2011 | Cordeiro | ............. | H04B 7/0617 370/338 |
| 2014/0185551 A1* | 7/2014 | Sanderovich | ......... | H04L 1/0015 370/329 |
| 2014/0192914 A1* | 7/2014 | Liu | ...................... | H04B 7/0617 375/260 |
| 2014/0301219 A1* | 10/2014 | Ben-Haim | ................ | G01S 5/14 370/252 |
| 2015/0230263 A1* | 8/2015 | Roy | ................... | H04W 36/0083 455/452.2 |
| 2015/0249929 A1* | 9/2015 | Irie | ...................... | H04B 7/0695 370/329 |
| 2015/0289147 A1* | 10/2015 | Lou | ...................... | H04B 7/0408 370/329 |
| 2016/0044711 A1* | 2/2016 | Lou | ................... | H04W 74/0816 370/338 |
| 2016/0105229 A1* | 4/2016 | Trainin | ................ | H04B 7/0617 370/329 |
| 2016/0119046 A1* | 4/2016 | Trainin | ................ | H04B 7/0617 375/267 |
| 2017/0026099 A1* | 1/2017 | Levy | ................... | H04B 7/0617 |

OTHER PUBLICATIONS

Wi-Fi Alliance Technical Committee P2P Task Group; Wi-Fi Peer-to-Peer (P2P) Technical Specification; Version 1.2; Dec. 14, 2011; 160 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Office Action for U.S. Appl. No. 14/583,148, dated Jun. 3, 2016, 20 pages.

Office Action for U.S. Appl. No. 14/583,148, dated Dec. 15, 2016, 17 pages.

Notice of Allowance for U.S. Appl. No. 14/583,148, dated Mar. 16, 2017, 15 pages.

* cited by examiner

APPARATUS, SYSTEM AND METHOD OF BEAMFORMING

CROSS REFERENCE

This Application claims the benefit of and priority from U.S. Provisional Patent Application No. 62/065,039 entitled "Apparatus, System and Method of Beamforming", filed Oct. 17, 2014, and from U.S. Provisional Patent Application No. 62/062,164 entitled "Apparatus, System and Method of Beamforming", filed Oct. 10, 2014, the entire disclosures of which are incorporated herein by reference.

TECHNICAL FIELD

Embodiments described herein generally relate to beamforming.

BACKGROUND

A wireless communication network in a millimeter-wave band may provide high-speed data access for users of wireless communication devices.

A beamforming procedure may be configured to steer a first directional antenna of a first wireless communication device, e.g., a beamforming initiator (BI), and a second directional antenna of a second wireless communication device, e.g., a beamforming responder (BR). The beamforming procedure may be performed, for example, to establish a high throughout communication link between the BI and the BR, e.g., at an acceptable communication range between the BR and the BI.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
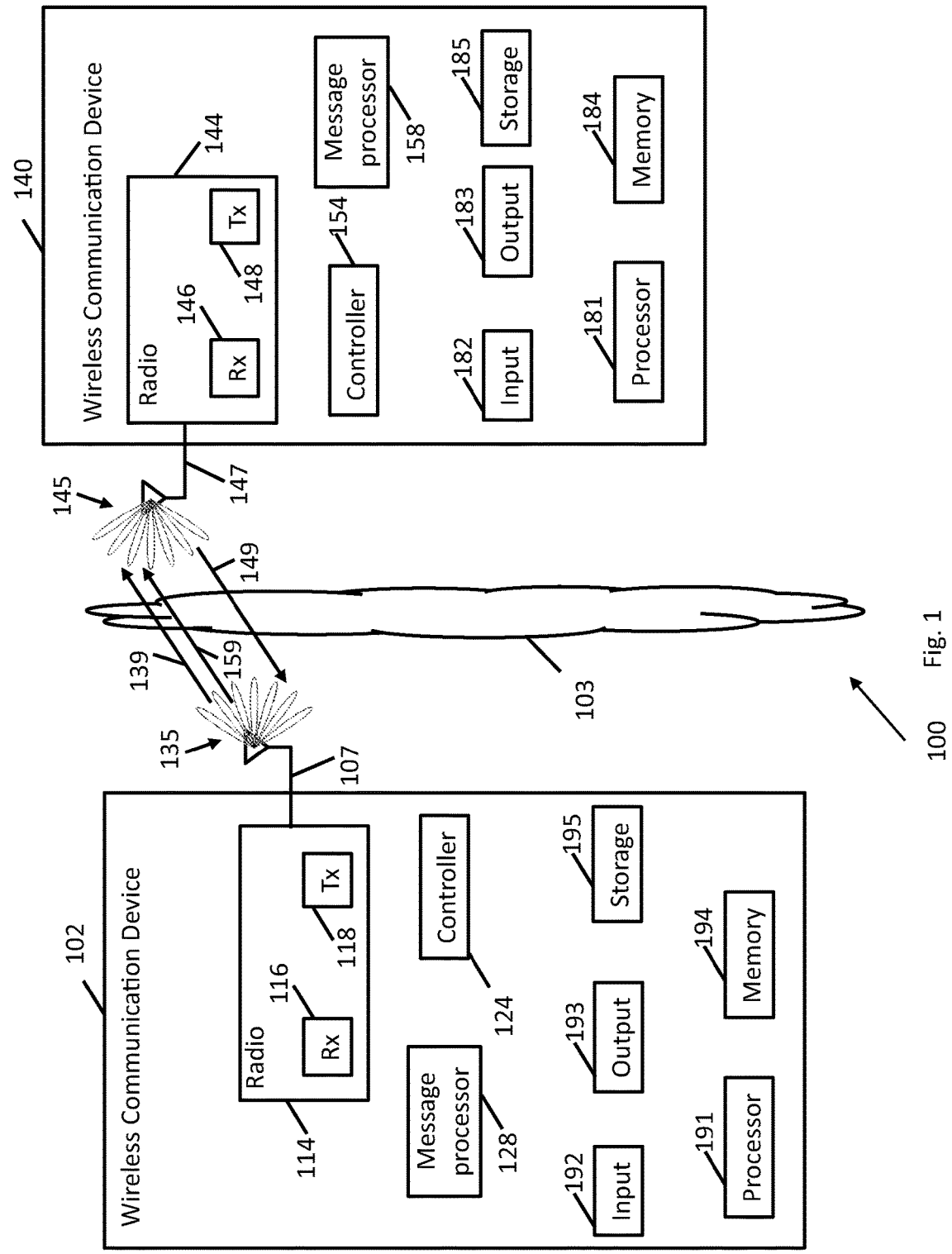
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc., WiGig MAC and PHY Specification Version* 1.1, April 2011, *Final specification*) and/or future versions and/or derivatives thereof, devices and/or networks operating in accordance with existing IEEE 802.11 standards (*IEEE* 802.11-2012, *IEEE Standard for Informa-* tion technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmcm/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification")) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices of system 100 may be configured to perform beamforming between a first device performing the functionality of a beamforming Initiator (BI), and a second device performing the functionality of a Beamforming Responder (BR). For example, wireless communication device 102 may perform the functionality of the BI, and/or wireless communication device 140 may perform the functionality of the BR.

In other embodiments, wireless communication device 140 may perform the functionality of the BI, and/or wireless communication device 102 may perform the functionality of the BR.

In some demonstrative embodiments, devices 102 and/or 140 may include a mobile device or a non-mobile, e.g., a static, device. For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, an Internet of Things (IoT0 device, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments WM 103 may include any other directional channel.

In some demonstrative embodiments, devices 102 and 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include at least one directional antenna, which may be steered to a plurality of beam directions. For example, antenna 107 may be steered to a plurality of beam directions 135, and/or antenna 147 may be steered to a plurality of beam directions 145.

In some demonstrative embodiments, devices 102 and/or 140 may select a pair of beams including a first beam direction of the plurality of beam directions 135, e.g., including a direction 133, and a second beam direction of the plurality of beam directions 145, e.g., including a direction 143, to communicate between devices 102 and 140, for example, via a mmWave wireless communication link, e.g., a DMG link.

In some demonstrative embodiments, device 102 may include a controller 124, and/or device 140 may include a controller 154. Controllers 124 and/or 154 may be configured to perform one or more beamforming operations and/or procedures between devices 102 and 140 and/or control any other functionalities of devices 102 and/or 140, e.g., as described below.

In some demonstrative embodiments, controllers 124 and/or 154 may include circuitry, e.g., one or more processors including circuitry and/or logic, memory circuitry, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In some demonstrative embodiments, device 102 may include a message processor 128 configured to generate, process and/or access one or messages communicated by device 102, e.g., as described below.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140, e.g., as described below.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry, e.g., one or more processors including circuitry, memory circuitry, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102 and 140 may perform a Beamforming procedure, for example, a beamforming training procedure, including a Sector level sweep (SLS) phase, e.g., as described below.

In some demonstrative embodiments, the beamforming procedure may include a plurality of beamforming transmissions, which may be communicated by the beamforming initiator and/or the beamforming responder, e.g., as described below.

In some demonstrative embodiments, the beamforming procedure may include a sequence of sector sweep components or periods (also referred to as "sector sweeps"), during which beamforming transmissions are to be performed. For example, the beamforming procedure may include at least first and second sector sweep components or periods. For example, the first sector sweep may be performed by a first device of the beamforming initiator and the beamforming responder, and the second sector sweep may be performed by a second device of the beamforming initiator and the beamforming responder. For example, the first sector sweep component may include a beamforming transmission from the first device, and the second sector sweep component may include a second beamforming transmission from the second device, e.g., as described below.

In some demonstrative embodiments, the beamforming procedure may include more than two sector sweeps, for example, a sequence of at least first, second and third sector sweeps. For example, the first sector sweep may be performed by a first device of the beamforming initiator and the beamforming responder, the second sector sweep may be performed by a second device of the beamforming initiator and the beamforming responder, and the third sector sweep may be performed by the first device. For example, the first sector sweep component may include a beamforming transmission from the first device, the second sector sweep component may include a second beamforming transmission from the second device, and the third sector sweep component may include a third beamforming transmission from the first device, e.g., as described below.

In some demonstrative embodiments, the SLS phase may include, for example, a first component including a beamforming transmission in the form of an Initiator Sector Sweep (ISS), which may include a sector sweep performed, for example, by the Beamforming initiator.

In some demonstrative embodiments, the ISS may be configured to train an initiator link of the beamforming initiator. The ISS may include, for example, an Initiator Transmit Sector Sweep (TXSS), during which the beamforming initiator may transmit a plurality of beamforming (BF) frames, for example, a plurality of Sector Sweep (SSW) frames, e.g., as described below.

In some demonstrative embodiments, the SLS phase may include a second component including a beamforming transmission in the form of a responder sector sweep (RSS), which may include a sector sweep performed, for example, by the Beamforming responder. The RSS may, for example, follow the ISS.

In some demonstrative embodiments, the RSS may be configured to train a responder link of the beamforming responder. The RSS may include, for example, a Responder Transmit Sector Sweep (TXSS), during which the beamforming responder may transmit a plurality of beamforming (BF) frames, for example, a plurality of Sector Sweep (SSW) frames, e.g., as described below.

In some demonstrative embodiments, the SLS may include a third component including a beamforming transmission in the form of a Sector Sweep Feedback (also referred to as "Initiator Feedback") including at least one SSW frame, for example, a SSW feedback frame, transmitted by the beamforming initiator, e.g., to the beamforming responder. The sector sweep feedback may be performed, for example, following the RSS.

In some demonstrative embodiments, the SLS may include a fourth component including a beamforming transmission in the form of a Sector Sweep acknowledge (ACK) including at least one acknowledge frame, transmitted by the beamforming responder, e.g., to the beamforming initiator. The sector sweep ACK may be performed, for example, following the RSS.

Some demonstrative embodiments are described herein with respect to an ISS, a RSS, and/or a sector sweep feedback, which may be performed during a SLS phase. However, in other embodiments, the ISS, the RSS and/or the sector seep feedback may be performed as part of any other phase and/or procedure.

Some demonstrative embodiments are described herein within respect to beamforming transmissions including an ISS, RSS, SSW feedback and/or SSW ACK. In other embodiments, the beamforming transmissions may include any other beamforming transmissions, e.g., of any other components of a beamforming procedure.

In some demonstrative embodiments, one of devices 102 and 140 may perform the functionality of a first station, and another one of devices 102 and 140 may perform the functionality of a second station, e.g., as described below.

In some demonstrative embodiments, the first station may transmit to the second station a plurality of first Sector Sweep (SSW) frames, for example, of a first beamforming transmission, e.g., a first sector sweep component, of a beamforming procedure, and the first station may receive from the second station one or more second SSW frames, for example, of a second beamforming transmission, e.g., a sector sweep component, of the beamforming procedure, e.g., at a period subsequent to the first beamforming transmission, e.g., as described below.

In some demonstrative embodiments, device 102 may perform the functionality of the first station, and device 140 may perform the functionality of the second station, for example, with respect to the first sector sweep frames including SSW frames of an ISS, and the second sector sweep frames including SSW frames of an RSS.

In some demonstrative embodiments, device 140 may perform the functionality of the first station, and device 102 may perform the functionality of the second station, for example, with respect to the first sector sweep frames including SSW frames of the RSS, and the second sector sweep frames including at least one SSW feedback frame of the sector sweep feedback component, e.g., as described below.

In one example, controller 124 may cause message generator 128 to generate a plurality of SSW frames of an ISS, and controller 124 may cause radio 114 to transmit the plurality of SSW frames to device 140 during the ISS. According to this example, radio 144 may receive one or more of the plurality of SSW frames of the ISS, and message processor 158 and/or controller 154 may process the one or more received SSW frame of the ISS.

According to this example, controller 154 may cause message generator 158 to generate a plurality of SSW frames of an RSS, e.g., in response to the ISS, and controller 154 may cause radio 144 to transmit the plurality of SSW frames to device 102 during the RSS. According to this example, radio 114 may receive one or more of the plurality of SSW frames of the RSS, and message processor 128 and/or controller 124 may process the one or more received SSW frame of the RSS.

According to this example, controller 124 may cause message generator to generate at least one sector sweep feedback frame, e.g., in response to the RSS, and controller 124 may cause radio 114 to transmit the at least one sector sweep feedback frame to device 140 during the sector sweep feedback. According to this example, radio 144 may receive the at least one sector sweep feedback frame, and message processor 158 and/or controller 154 may process the at least one sector sweep feedback frame.

In some demonstrative embodiments, device 102 may perform the functionality of the beamforming initiator. For example, message processor 128 may generate a plurality of Sector Sweep (SSW) frames 139 of the ISS, and radio 114 may transmit the plurality of SSW frames 139 during the ISS. The Sector sweep frames 139 may include a duration field to indicate a duration.

In some demonstrative embodiments, device 140 may perform the functionality of the beamforming responder. For example, radio 144 may receive one or more frames of the SSW frames 139 during the ISS.

In some demonstrative embodiments, the beamforming responder, e.g., device 140, may transmit a plurality of SSW frames 149 of an RSS, e.g., subsequent to the ISS. For example, message processor 158 may generate the plurality of Sector Sweep (SSW) frames 149 of the RSS, and radio 144 may transmit the plurality of SSW frames 149 during the RSS. The SSW frames 149 may include a duration field to indicate a duration.

In some demonstrative embodiments, radio 114 may receive one or more frames of the SSW frames 149 during the RSS.

In some demonstrative embodiments, the beamforming initiator, e.g., device 102, may transmit at least one sector sweep feedback frame 159 of a sector sweep feedback, e.g., subsequent to the RSS. For example, message processor 128 may generate the sector sweep feedback frame 159, and radio 114 may transmit the sector sweep feedback frame 159 during the sector sweep feedback.

In some demonstrative embodiments, the beamforming responder, e.g., device 140, may receive the at least one sector sweep feedback frame 159.

In some demonstrative embodiments, one or more devices, e.g., other than devices 102 and 140, may set a period ("the protected period"), for example, based on the duration indicated by the duration field in the SSW frames 139 and/or 149. For example, the one or more devices may set a Network allocation Vector (NAV) or any other timer or function, based on the duration indicated by the duration field. For example, during the protected period, the one or more devices may avoid performing a transmission over wireless medium 103.

In some demonstrative embodiments, setting the duration field in the SSW frames 139 of the ISS phase to cover only the sequence of the SSW frames 139 of the ISS, and/or setting the duration field in the SSW frames 149 of the RSS phase to cover only the sequence of the SSW frames 149 of the RSS, may enable potential interference between another station and the SLS phase, e.g., as described below.

In some demonstrative embodiments, a distance between the ISS and the RSS may be defined, e.g., as a Medium Beamforming Interframe Spacing (MBIFS) period.

In some demonstrative embodiments, a distance between the RSS and the ISS may be defined, e.g., as a MBIFS period.

In some demonstrative embodiments, the MBIFS period may be, for example, longer than a Short Interframe Space (SIFS) time interval.

In some demonstrative embodiments, the Beamforming responder, e.g., device 140, may start the RSS right after the MBIFS period following the ISS, e.g., without performing any carrier sensing of WM 103.

In some demonstrative embodiments, the Beamforming initiator, e.g., device 102, may start the sector sweep feedback right after the MBIFS period following the RSS, e.g., without performing any carrier sensing of WM 103.

In some demonstrative embodiments, setting the duration field in the SSW frames 139 of the ISS phase to cover only the sequence of the SSW frames of the ISS may result in a problematic situation, in which one or more of the SSW frames 149 during the RSS may interfere with one or more frames sent by another station, e.g., as described below.

In some demonstrative embodiments, setting the duration field in the SSW frames 149 of the RSS phase to cover only the sequence of the SSW frames of the RSS may result in a problematic situation, in which sector sweep feedback frame 159 during the sector sweep feedback may interfere with one or more frames sent by another station, e.g., as described below.

Figure 2:
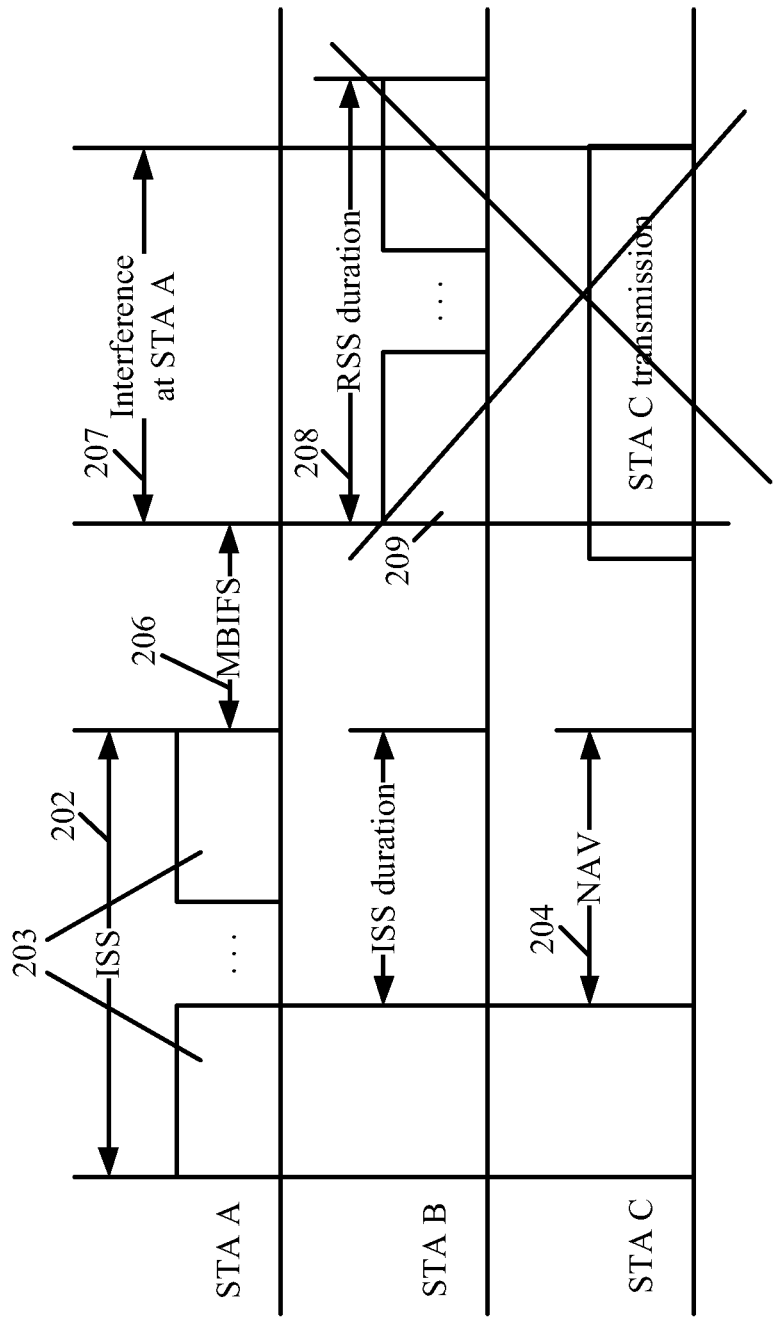
FIG. 2 is a schematic illustration of interference between transmissions from a station and transmissions of a Responder Sector Sweep (RSS) from a beamforming responder station to a beamforming initiator station, in accordance with some demonstrative embodiments.

Reference is made to FIG. 2, which schematically illustrates interference between transmission by a station ("STA C") and transmissions of an RSS 208 from a beamforming responder station ("STA B") to a beamforming initiator station ("STA A"), in accordance with some demonstrative embodiments.

As shown in FIG. 2, in some demonstrative embodiments, the STA C may set a Network Allocation Vector (NAV) to a duration 204 based on a duration indicated by SSW frames 203 transmitted by STA A during an ISS 202.

As shown in FIG. 2, setting the duration of the SSW frames 203 to cover only the ISS 202 may result in STA C being able to gain access to the wireless medium, e.g., during an MBIFS period 206 following the ISS 202 or at a beginning of the RSS 208, e.g., prior to STA B transmitting a first SSW 209 of the RSS 208.

As further shown in FIG. 2, the STA C may perform a transmission, which may interfere (207) with one or more of the SSW frames, e.g., the SSW frame 209, transmitted by STA B during the RSS 208.

The description above with respect to FIG. 2 demonstrates a situation of interference with respect to transmissions of an RSS. This description with respect to FIG. 2 may also be applied to demonstrate interference between transmission by the STA C and transmissions of a SSW feedback from the beamforming initiator station to the beamforming responder station. For example, in order to demonstrate this situation, the period 202 may include the RSS, the period 208 may include the SSW feedback period, SSW frames 203 may include SSW frames of the RSS, and frame 209 may include the SSW feedback frame.

Referring back to FIG. 1, in some demonstrative embodiments controller 124 may be configured to extend the duration in the SSW frames 139 of the ISS, for example, to cover a duration longer than the duration of the ISS, e.g., as described below.

In some demonstrative embodiments, controller 124 may be configured to extend the duration in one or more of the SSW frames 139 of the ISS, e.g., each of the SSW frames 139 or only some of the SSW frames 139, for example, to cover at least part of the MBIFS period following the ISS.

In one example, controller 124 may set the duration value in a SSW frame 139 of the ISS to indicate a time until at least within the MBIFS following the ISS.

In some demonstrative embodiments, controller 124 may be configured to extend the duration in one or more of the SSW frames 139 of the ISS, e.g., each of the SSW frames 139 or only some of the SSW frames 139, for example, to cover at least the entire MBIFS period following the ISS.

In one example, controller 124 may set the duration value in a SSW frame 139 of the ISS to indicate a time until at least an end of the MBIFS period following the ISS.

In some demonstrative embodiments, controller 124 may be configured to extend the duration one or more of the SSW frames 139 of the ISS, e.g., each of the SSW frames 139 or only some of the SSW frames 139, for example, to cover a time until at least a beginning of the RSS subsequent to the ISS.

In one example, controller 124 may set the duration value in a SSW frame 139 of the ISS to indicate a time until at least a beginning of the RSS subsequent to the ISS.

In some demonstrative embodiments, controller 124 may be configured to extend the duration one or more of the SSW frames 139 of the ISS, e.g., each of the SSW frames 139 or only some of the SSW frames 139, for example, to cover the MBIFS period and transmission of at least a first SSW sent in the RSS.

In one example, controller 124 may set the duration value in a SSW frame 139 of the ISS to indicate a time until an end of a first SSW frame in the RSS subsequent to the ISS.

In some demonstrative embodiments, controller 124 may set a duration field of a SSW frame 139 to be transmitted during the ISS to a duration value, which may be determined, for example, based on the sum of a remaining time of the ISS, and the MBIFS.

In some demonstrative embodiments, controller 124 may set a duration field of a SSW frame 139 to be transmitted during the ISS to a duration value, which may be determined, for example, based on the sum of a remaining time of the ISS, the MBIFS, and a duration of at least one SSW frame in the RSS, e.g., a first SSW in the RSS.

In some demonstrative embodiments, controller 154 may be configured to extend the duration one or more of the SSW frames 149 of the RSS, e.g., each of the SSW frames 149 or only some of the SSW frames 149, for example, to cover a duration longer than the duration of the RSS, e.g., as described below.

In some demonstrative embodiments, controller 154 may be configured to extend the duration in one or more of the SSW frames 149 of the RSS, e.g., each of the SSW frames 149 or only some of the SSW frames 149, for example, to cover at least part of the MBIFS period following the RSS.

In one example, controller 154 may set the duration value in a SSW frame 149 of the RSS to indicate a time until at least within the MBIFS following the RSS.

In some demonstrative embodiments, controller 154 may be configured to extend the duration in one or more of the SSW frames 149 of the RSS, e.g., each of the SSW frames 149 or only some of the SSW frames 149, for example, to cover at least the entire MBIFS period following the RSS.

In one example, controller 154 may set the duration value in a SSW frame 149 of the RSS to indicate a time until at least an end of the MBIFS period following the RSS.

In some demonstrative embodiments, controller 154 may be configured to extend the duration in one or more of the SSW frames 149 of the RSS, e.g., each of the SSW frames 149 or only some of the SSW frames 149, for example, to cover a time until at least a beginning of the SSW feedback subsequent to the RSS.

In one example, controller 154 may set the duration value in a SSW frame 149 of the RSS to indicate a time until at least a beginning of the SSW feedback subsequent to the RSS.

In some demonstrative embodiments, controller 154 may be configured to extend the duration in one or more of the SSW frames 149 of the RSS, e.g., each of the SSW frames 149 or only some of the SSW frames 149, for example, to cover the MBIFS period and transmission of a SSW feedback frame of the SSW feedback.

In one example, controller 154 may set the duration value in a SSW frame 149 of the RSS to indicate a time until an end of a SSW feedback frame in the SSW feedback subsequent to the RSS.

In some demonstrative embodiments, controller 154 may set a duration field of a SSW frame 149 to be transmitted during the RSS to a duration value, which may be determined, for example, based on the sum of a remaining time of the RSS, and the MBIFS.

In some demonstrative embodiments, controller 154 may set a duration field of a SSW frame 149 to be transmitted during the RSS to a duration value, which may be determined, for example, based on the sum of a remaining time of the RSS, the MBIFS, and a duration of a SSW feedback frame of the SSW feedback.

In some demonstrative embodiments, an extended duration of a SSW frame, e.g., a SSW frame 139 of the ISS, or a SSW frame 149 of the ISS, may be determined, for example, by adding a duration of MBIFS+TXTIME(SSW), wherein TXTIME(SSW) denotes a transmission time of a SSW frame, to the calculation of the Duration field in SSW frames of the ISS and/or the RSS.

In one example, controller 124 may be adapted to determine the duration field of frames 139, e.g., by adding the duration MBIFS+TXTIME (SSW) to the duration of the ISS calculated for frames 139.

In one example, controller 154 may be adapted to determine the duration field of frames 149 by adding the duration MBIFS+TXTIME (SSW) to the duration of the RSS calculated for frames 149.

In some demonstrative embodiments, the duration field of the SSW frames 139 in the ISS may be set to an extended duration. The Extended duration may include, for example, a duration covering at least part of the MBIFS subsequent to the ISS, for example, a duration to indicate a time until at least a beginning of the RSS subsequent to the ISS, e.g., a duration to indicate the time until an end of a first SSW in the RSS, or any other time longer than the ISS, e.g., as described above.

In some demonstrative embodiments, setting the duration field of the SSW frames 139 in the ISS to the extended duration may cause another station to set a NAV to cover the extended duration, e.g., thereby preventing the other station from attempting to begin link access inside the MBIFS interval and/or prior to transmission of the first SSW of the RSS. Accordingly, setting the duration field of the SSW frames in the ISS to the extended duration may enable avoiding the potential interference during the RSS.

In some demonstrative embodiments, setting the duration field of the SSW frames 139 in the ISS to cover the extended duration may provide improved results and/or performance, for example, compared to a scheme of regular link access, e.g., to require the beamforming responder to perform carrier sensing prior to transmitting the SSW frames 149 of the RSS. For example, setting the duration field of the SSW frames 139 in the ISS the extended duration may enable maintaining the SLS phase uninterrupted. In some implementations, keeping the SLS phase uninterrupted may be highly desirable, e.g., due to changing link conditions.

In some demonstrative embodiments, setting the duration field of the SSW frames 139 in the ISS the extended duration may provide improved results and/or performance, for example, compared to a scheme providing NAV coverage of the entire SLS phase. For example, providing NAV coverage of the entire SLS phase may lead to a situation, in which the time period of the RSS is "wasted", for example, if the intended Beamforming responder does not receive any ISS frame 139 and is not able to respond in the RSS allocated time.

In some demonstrative embodiments, the duration field of the SSW frames 149 in the RSS may be set to an extended duration. The Extended duration may include, for example, a duration covering at least part of the MBIFS subsequent to the RSS, for example, a duration to indicate a time until at least a beginning of the SSW feedback subsequent to the RSS, e.g., a duration to indicate the time until an end of a SSW feedback frame, or any other time longer than the RSS, e.g., as described above.

In some demonstrative embodiments, setting the duration field of the SSW frames 149 in the RSS to the extended duration may cause another station to set a NAV to cover the extended duration, e.g., thereby preventing the other station from attempting to begin link access inside the MBIFS interval and/or prior to transmission of the SSW feedback frame. Accordingly, setting the duration field of the SSW frames in the RSS to the extended duration may enable avoiding the potential interference during the SSW feedback.

In some demonstrative embodiments, setting the duration field of the SSW frames 149 in the RSS to cover the extended duration may provide improved results and/or performance, for example, compared to a scheme of regular link access, e.g., to require the beamforming initiator to perform carrier sensing prior to transmitting the SSW feedback frame. For example, setting the duration field of the SSW frames 149 in the RSS to the extended duration may enable maintaining the SLS phase uninterrupted. In some implementations, keeping the SLS phase uninterrupted may be highly desirable, e.g., due to changing link conditions.

In some demonstrative embodiments, setting the duration field of the SSW frames 149 in the RSS to the extended duration may provide improved results and/or performance, for example, compared to a scheme providing NAV coverage of the entire SLS phase. For example, providing NAV coverage of the entire SLS phase may lead to a situation, in which the time period of the SSW feedback is "wasted", for example, if the intended Beamforming initiator does not receive any RSS frame 149 and is not able to respond in the SSW feedback allocated time.

Figure 3:
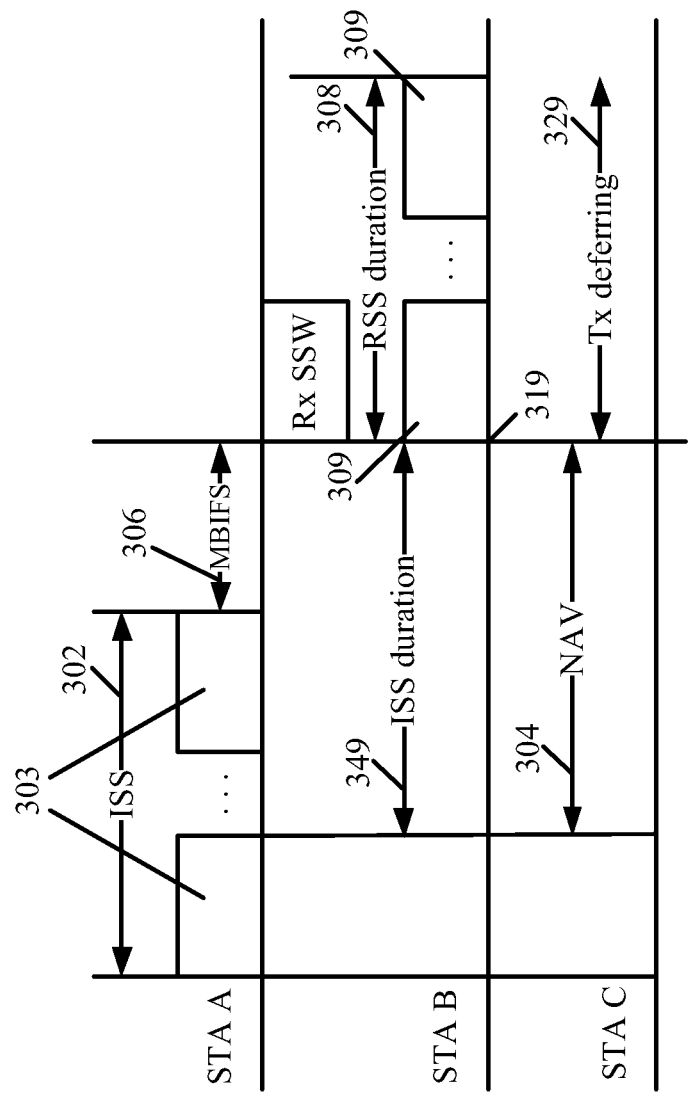
FIG. 3 is a schematic illustration of extending a protected duration of an Initiator Sector Sweep (ISS) over a Medium Beamforming Interframe Spacing (MBIFS) period, in accordance with some demonstrative embodiments.

Reference is made to FIG. 3, which schematically illustrates extending a protected duration of an ISS 302 over a MBIFS period 306, in accordance with some demonstrative embodiments. For example, one or more of the communications shown in FIG. 3 may be performed by devices 102 and/or 140 (FIG. 1).

As shown in FIG. 3, a Beamforming initiator (STA A), e.g., device 102 (FIG. 1), may transmit SSW frames 303, e.g., frames 139 (FIG. 1), to a Beamforming Responder (STA B), e.g., device 140 (FIG. 1), during the ISS 302, while setting an extended duration value to the duration field of the SSW frames 303.

In some demonstrative embodiments, the extended duration value may be configured to cover at least part of the duration of the MBIFS 306 following the ISS 302.

In one example, as shown in FIG. 3, the extended duration value may be configured to cover the entire duration of the MBIFS 306, for example, until a beginning 319 of a RSS 308 subsequent to the ISS 302.

Accordingly, as shown in FIG. 3, a protected duration 349 of the ISS 302 may be extended over the MBIFS 306, e.g., until the beginning 319 of RSS 308.

As shown in FIG. 3, a station (STA C) receiving the SSW frames 303 of the ISS 302 may set a NAV 304 at the STA C, e.g., according to the extended duration value in the SSW frames 303.

As a result, as shown in FIG. 3, the STA C may set the NAV 304 to cover the MBIFS 306, e.g., until the beginning 319 of the RSS 308.

As shown in FIG. 3, the STA B may be allowed to start the RS, for example, immediately at the end of the MBIFS 306. This is in contrast to other stations, for example the STA C, which may be required to wait, for example, a Distributed Coordination Function (DCF) Inter Frame Space (DIFS) and a random backoff period after the end of MBIFS 306, before attempting to transmit over WM 103.

Accordingly, STA C may only be allowed to attempt to access the wireless communication link, after expiration of the extended NAV 304, which may cover the MBIFS period 306, and after waiting for the DIFS and the random backoff period.

In some demonstrative embodiments, when attempting to access the medium, STA C may have to defer a transmission for a transmit deferring period 329, e.g., if STA B begins transmitting SSW frames 309 of the RSS 308, and the STA C senses the carrier of the SSW frames 309 sent by the STA B.

Alternatively, STA C may begin transmission, for example, if STA B does not receive any SSW frame 303 of the ISS 302, and is not able to respond in the RSS allocated time 308.

Figure 4:
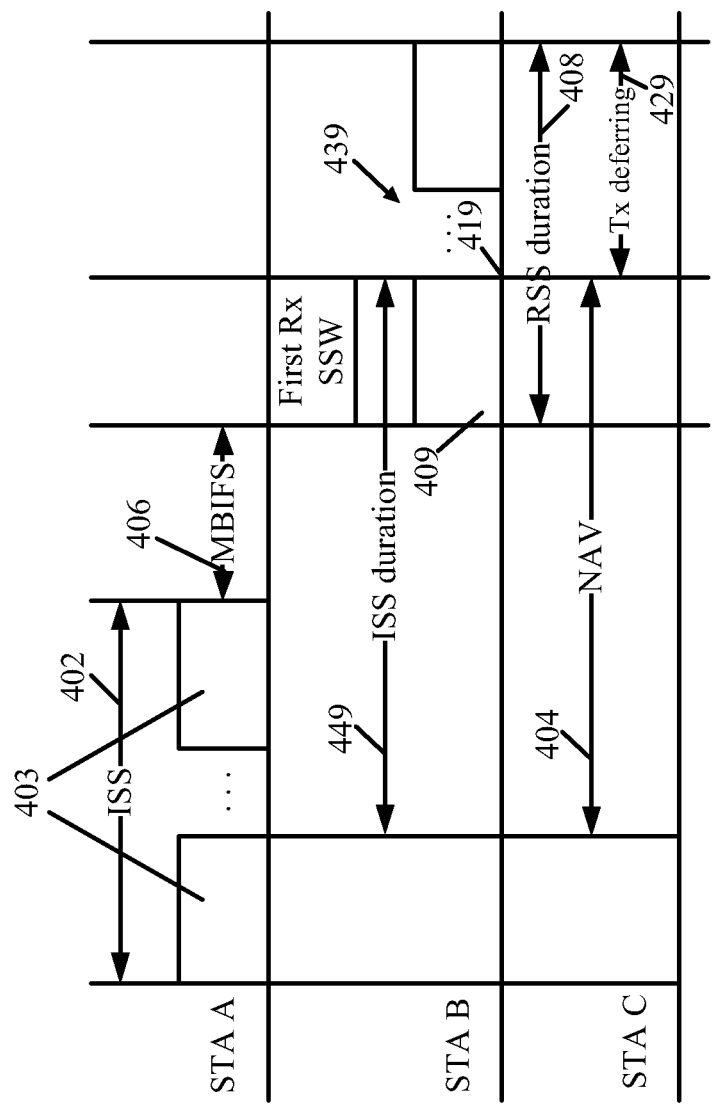
FIG. 4 is a schematic illustration of extending a protected duration of an ISS over a MBIFS period and a first Sector Sweep (SSW) frame of a RSS, in accordance with some demonstrative embodiments.

Reference is made to FIG. 4, which schematically illustrates extension of the duration of the protection of an ISS 402 over an MBIFS 406 subsequent to the ISS 402, and at least one SSW 439, e.g., a first SSW 409, of a RSS 408 following the MBIFS 406, in accordance with some demonstrative embodiments. For example, one or more of the communications shown in FIG. 4 may be performed by devices 102 and/or 140 (FIG. 1).

As shown in FIG. 4, a Beamforming initiator (STA A), e.g., device 102 (FIG. 1), may transmit SSW frames 403, e.g., frames 139 (FIG. 1) to a Beamforming Responder (STA B), during the ISS 402, while setting an extended duration value to the duration field of the SSW frames.

In some demonstrative embodiments, the extended duration may indicate a time until an end of at least one SSW frame 439 within RSS 408.

For example, as shown in FIG. 4, the extended duration value may be configured to cover the duration of the MBIFS 406 following the ISS 402 and a transmission time of a first SSW frame 409, e.g., frame 149 (FIG. 1), in the RSS 408 following the MBIFS period 406.

Accordingly, as shown in FIG. 4, a protected duration 449 of the ISS may be extended over the MBIFS 406 and the first SSW frame 409 in the RSS 408, for example, until an end 419 of the first SSW frame 409 in the RSS 408.

As shown in FIG. 4, a station (STA C) receiving the SSW frames 403 of the ISS 402 may set a NAV 404 according to the extended duration value.

As a result, the STA C may set the NAV 404 to cover the MBIFS 406 and the transmission time of the first SSW 409 in the RSS 408, e.g., until the end 419 of the first SSW frame 409.

Accordingly, STA C may attempt to access the wireless communication link, after expiration of the extended NAV 404, which may cover the MBIFS period 406 and the first SSW frame 409 of the RSS 408, e.g., until the end 419 of SSW frame 409.

In some demonstrative embodiments, when attempting to access the medium, STA C may have to defer a transmission for a transmit deferring period 429, e.g., if STA B begins transmitting the SSW frames 439 of the RSS, and STA C senses the carrier of the SSW frames 439, e.g., the first SSW frame 409, sent by the STA B.

Alternatively, STA C may begin the transmission, for example, if STA B does not receive any SSW frame 403 of the ISS 402, and is not able to respond in the RSS allocated time 408.

Figure 5:
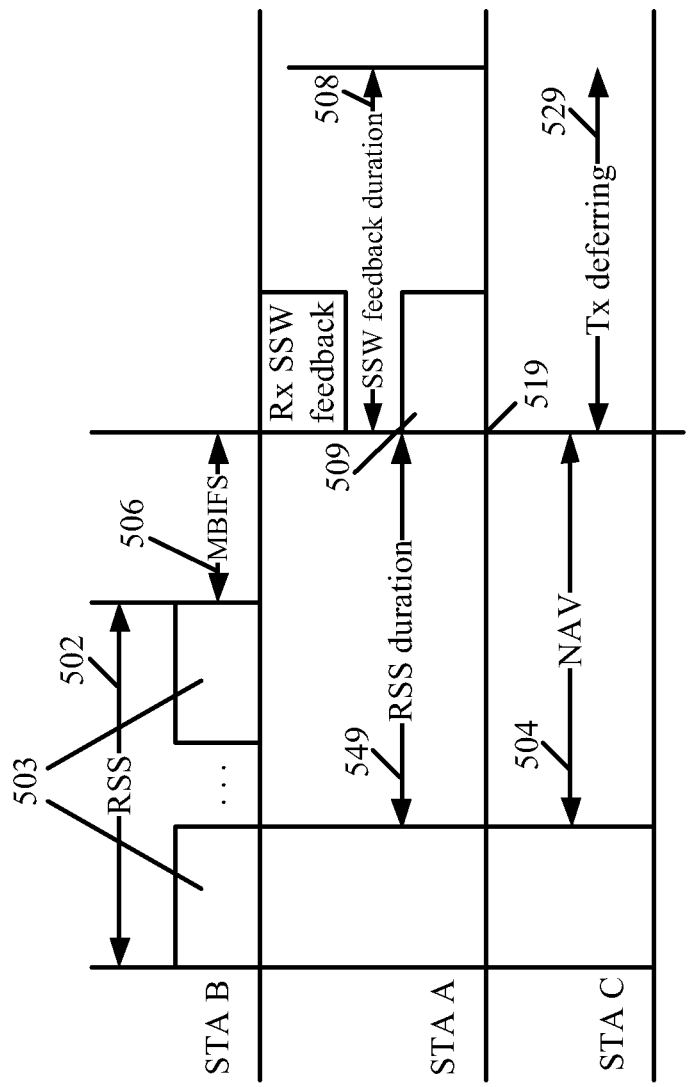
FIG. 5 is a schematic illustration of extending a protected duration of a RSS, in accordance with some demonstrative embodiments.

Reference is made to FIG. 5, which schematically illustrates extending a protected duration of an RSS 502, in accordance with some demonstrative embodiments. For example, one or more of the communications shown in FIG. 5 may be performed by devices 102 and/or 140 (FIG. 1).

As shown in FIG. 5, a Beamforming responder (STA B), e.g., device 140 (FIG. 1), may transmit a plurality of SSW frames 503, e.g., frames 149 (FIG. 1), to a Beamforming initiator (STA A), e.g., device 102 (FIG. 1), during the RSS 502, while setting an extended duration value to the duration field of the SSW frames 503.

In some demonstrative embodiments, the extended duration value may be configured to extend until a time after an end of the RSS 502, e.g., as described above.

In some demonstrative embodiments, the extended duration value may be configured to cover at least part of the duration of an MBIFS 506 following the RSS 502.

In one example, as shown in FIG. 5, the extended duration value may be configured to cover the entire duration of the MBIFS 506, for example, until a beginning 519 of a SSW feedback 508 subsequent to the RSS 502.

In another example, the extended duration value may be configured to cover the entire duration of the MBIFS 506, for example, until an end of a SSW feedback frame 509 in the SSW feedback 508, e.g., as described above.

Accordingly, as shown in FIG. 5, a protected duration 549 of the RSS 502 may be extended over the MBIFS 506, e.g., until the beginning 519 of SSW feedback 508.

As shown in FIG. 5, a station (STA C) receiving the SSW frames 503 of the RSS 502 may set a NAV 504 at the STA C, e.g., according to the extended duration value in the SSW frames 503.

As a result, as shown in FIG. 5, the STA C may set the NAV 504 to cover the MBIFS 504, e.g., at least until the beginning 519 of the SSW feedback 508.

Accordingly, STA C may only be allowed to attempt to access the wireless communication link, after expiration of the extended NAV 504, which may cover the MBIFS period 506.

In some demonstrative embodiments, when attempting to access the medium, STA C may have to defer a transmission for a transmit deferring period 529, e.g., if STA A begins transmitting the SSW feedback frame 509 of the SSW feedback 508, and the STA C senses the carrier of the SSW feedback frame 509 sent by the STA A.

Alternatively, STA C may begin transmission, for example, if STA A does not receive any SSW frame 503 of the RSS 502, and is not able to respond in the SSW feedback allocated time 508.

Figure 6:
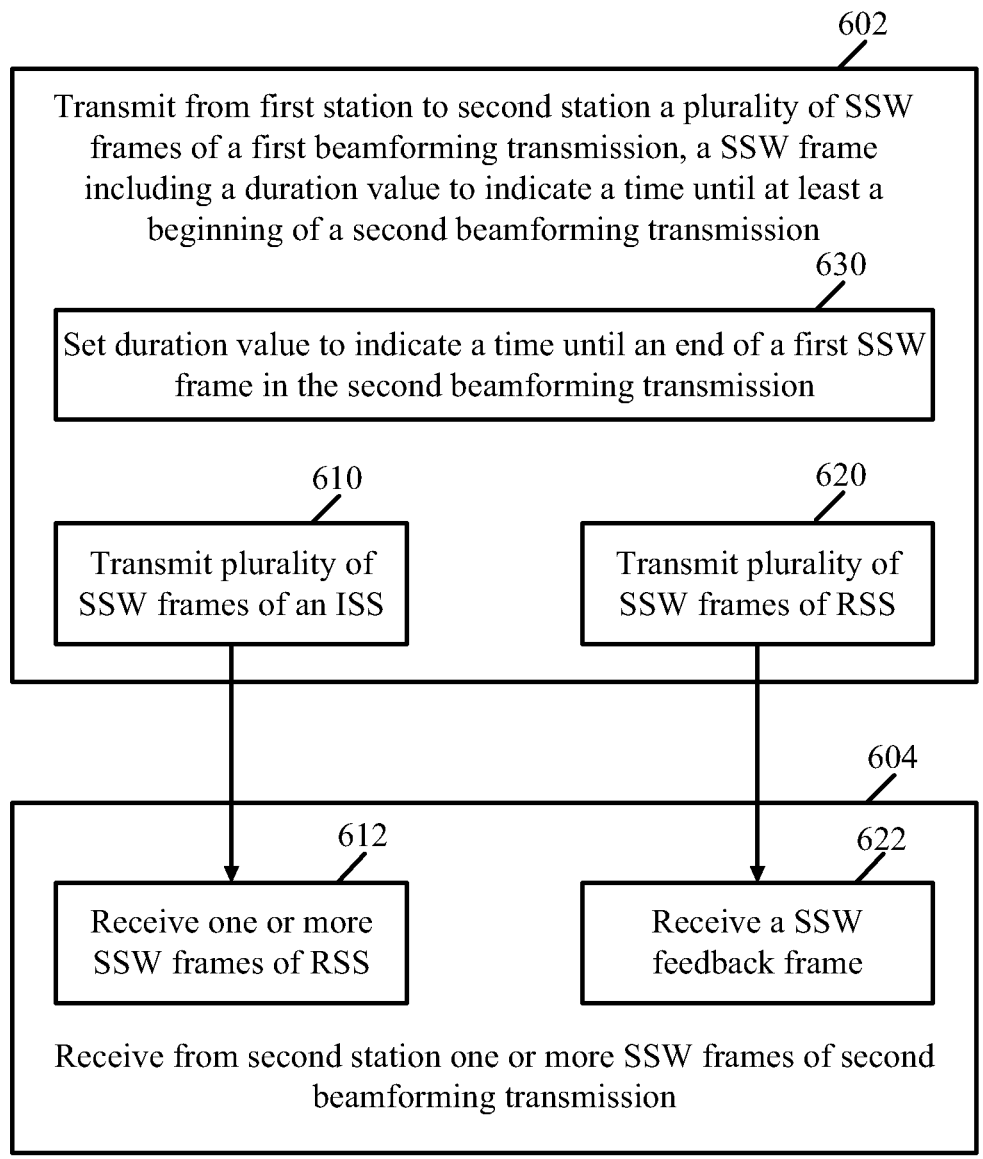
FIG. 6 is a schematic flow-chart illustration of a method of beamforming, in accordance with some demonstrative embodiments.

Reference is made to FIG. 6, which schematically illustrates a method of beamforming, in accordance with some demonstrative embodiments. For example, one or more operations of the method of FIG. 6 may be performed by one or more elements of a system, e.g., system 100 (FIG. 1), a device, e.g., device 102 (FIG. 1), device 140 (FIG. 1), a controller, e.g., controller 124 (FIG. 1), and/or controller 154 (FIG. 1), a radio, e.g., radio 114 (FIG. 1), and/or radio 144 (FIG. 1), and/or a message processor, e.g., message processor 128 (FIG. 1), and/or message processor 158 (FIG. 1).

As indicated at block 602, the method may include transmitting from a first station to a second station a plurality of SSW frames of a first beamforming transmission of a beamforming procedure, a SSW frame of the first beamforming transmission including a duration value to indicate a time until at least a beginning of a second beamforming transmission subsequent to the first beamforming transmission.

As indicated at block 604, the method may include receiving from the second station one or more SSW frames of the second beamforming transmission.

In some demonstrative embodiments, the plurality of SSW frames of the first beamforming transmission may be transmitted by a beamforming initiator, and the one or more SSW frames of the second beamforming transmission may be received from a beamforming responder, e.g., as described below.

As indicated at block 610, transmitting the plurality of SSW frames of the first beamforming transmission may include transmitting a plurality of SSW frames of an ISS. For example, device 102 (FIG. 1) may transmit the plurality of SSW frames 139 (FIG. 1) of the ISS, e.g., as described above.

As indicated at block 612, receiving the one or more SSW frames of the second beamforming transmission may include receiving one or more SSW frames of an RSS. For example, device 102 (FIG. 1) may receive the plurality of SSW frames 149 (FIG. 1) of the RSS, e.g., as described above.

In some demonstrative embodiments, the plurality of SSW frames of the first beamforming transmission may be transmitted by a beamforming responder, and the one or more SSW frames of the second beamforming transmission may be received from a beamforming initiator, e.g., as described below.

As indicated at block 620, transmitting the plurality of SSW frames of the first beamforming transmission may include transmitting a plurality of SSW frames of an RSS. For example, device 140 (FIG. 1) may transmit the plurality of SSW frames 149 (FIG. 1) of the RSS, e.g., as described above.

As indicated at block 622, receiving the one or more SSW frames of the second beamforming transmission may include receiving at least one SSW feedback frame of a SSW feedback. For example, device 140 (FIG. 1) may receive a SSW feedback frame 159 (FIG. 1) of the SSW feedback, e.g., as described above.

As indicated at block 630, the method may include setting the duration value to indicate a time until an end of a first SSW frame in the second beamforming transmission.

In one example, device 102 (FIG. 1) may transmit the plurality of SSW frames 139 (FIG. 1) including a duration value to indicate a time until an end of a first SSW frame 149 (FIG. 1) in the RSS, e.g., as described above.

In another example, device 140 (FIG. 1) may transmit the plurality of SSW frames 149 (FIG. 1) including a duration value to indicate a time until an end of a SSW feedback frame 159 (FIG. 1) in the SSW feedback, e.g., as described above.

Figure 7:
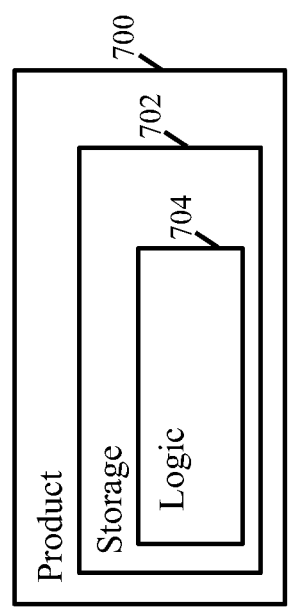
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102 and/or 140

(FIG. 1), transmitters 118 and/or 148 (FIG. 1), receivers 116 and/or 146 (FIG. 1), controllers 124 and/or 154 (FIG. 1), message processors 128 and/or 158 (FIG. 1), to perform one or more communications of the FIGS. 2, 3, 4, and/or 5, and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus including one or more processors having circuitry, the circuitry to cause a first station to transmit to a second station a plurality of sector sweep (SSW) frames of a first beamforming transmission of a beamforming procedure, a SSW frame of the first beamforming transmission including a duration value to indicate a time until at least a beginning of a second beamforming transmission subsequent to the first beamforming transmission; and to receive from the second station one or more SSW frames of the second beamforming transmission.

Example 2 includes the subject matter of Example 1, and optionally, wherein the duration value indicates a time until an end of a first SSW frame in the second beamforming transmission.

Example 3 includes the subject matter of Example 1, and optionally, wherein the second beamforming transmission is separated from the first beamforming transmission by a Medium Beamforming Interframe Spacing (MBIFS) period, the duration value being based on a sum of a remaining time of the first beamforming transmission, and the MBIFS.

Example 4 includes the subject matter of Example 1, and optionally, wherein the second beamforming transmission is separated from the first beamforming transmission by a Medium Beamforming Interframe Spacing (MBIFS) period, the duration value being based on a sum of a remaining time of the first beamforming transmission, the MBIFS, and a transmission time of a first SSW frame in the second beamforming transmission.

Example 5 includes the subject matter of any one of Examples 1-4, and optionally, wherein the first beamforming transmission and the second beamforming transmission are part of a Sector Level Sweep (SLS) of the beamforming procedure.

Example 6 includes the subject matter of any one of Examples 1-5, and optionally, wherein the first beamforming transmission is an Initiator Sector Sweep (ISS) and the second beamforming transmission is a responder Sector Sweep (RSS).

Example 7 includes the subject matter of any one of Examples 1-5, and optionally, wherein the first beamforming transmission is a responder Sector Sweep (RSS), and the second beamforming transmission is a Sector Sweep Feedback.

Example 8 includes the subject matter of any one of Examples 1-7, and optionally, comprising a transmitter to transmit the SSW frames of the first beamforming transmission, and a receiver to receive the SSW frames of the second beamforming transmission.

Example 9 includes the subject matter of any one of Examples 1-8, and optionally, wherein the first station is a Direct Multi Gigabit (DMG) station.

Example 10 includes the subject matter of any one of Examples 1-9, and optionally, comprising one or more antennas, and a memory.

Example 11 includes a wireless communication device comprising one or more antennas; a memory; a processor; a transmitter to transmit to a station a plurality of sector sweep (SSW) frames of a first beamforming transmission of a beamforming procedure, a SSW frame of the first beamforming transmission including a duration value to indicate a time until at least a beginning of a second beamforming transmission subsequent to the first beamforming transmission; and a receiver to receive from the station one or more SSW frames of the second beamforming transmission.

Example 12 includes the subject matter of Example 11, and optionally, wherein the duration value indicates a time until an end of a first SSW frame in the second beamforming transmission.

Example 13 includes the subject matter of Example 11, and optionally, wherein the second beamforming transmission is separated from the first beamforming transmission by a Medium Beamforming Interframe Spacing (MBIFS) period, the duration value being based on a sum of a remaining time of the first beamforming transmission, and the MBIFS.

Example 14 includes the subject matter of Example 11, and optionally, wherein the second beamforming transmission is separated from the first beamforming transmission by a Medium Beamforming Interframe Spacing (MBIFS) period, the duration value being based on a sum of a remaining time of the first beamforming transmission, the MBIFS, and a transmission time of a first SSW frame in the second beamforming transmission.

Example 15 includes the subject matter of any one of Examples 11-14, and optionally, wherein the first beamforming transmission and the second beamforming transmission are part of a Sector Level Sweep (SLS) of the beamforming procedure.

Example 16 includes the subject matter of anyone of Examples 11-15, and optionally, wherein the first beamforming transmission is an Initiator Sector Sweep (ISS) and the second beamforming transmission is a responder Sector Sweep (RSS).

Example 17 includes the subject matter of any one of Examples 11-15, and optionally, wherein the first beamforming transmission is a responder Sector Sweep (RSS), and the second beamforming transmission is a Sector Sweep Feedback.

Example 18 includes the subject matter of any one of Examples 11-17 including a Direct Multi Gigabit (DMG) station.

Example 19 includes a method to be performed by a first station, the method comprising transmitting to a second station a plurality of sector sweep (SSW) frames of a first beamforming transmission of a beamforming procedure, a SSW frame of the first beamforming transmission including a duration value to indicate a time until at least a beginning of a second beamforming transmission subsequent to the first beamforming transmission; and receiving from the second station one or more SSW frames of the second beamforming transmission.

Example 20 includes the subject matter of Example 19, and optionally, wherein the duration value indicates a time until an end of a first SSW frame in the second beamforming transmission.

Example 21 includes the subject matter of Example 19, and optionally, wherein the second beamforming transmission is separated from the first beamforming transmission by a Medium Beamforming Interframe Spacing (MBIFS) period, the duration value being based on a sum of a remaining time of the first beamforming transmission, and the MBIFS.

Example 22 includes the subject matter of Example 19, and optionally, wherein the second beamforming transmission is separated from the first beamforming transmission by a Medium Beamforming Interframe Spacing (MBIFS) period, the duration value being based on a sum of a remaining time of the first beamforming transmission, the MBIFS, and a transmission time of a first SSW frame in the second beamforming transmission.

Example 23 includes the subject matter of any one of Examples 19-22, and optionally, wherein the first beamforming transmission and the second beamforming transmission are part of a Sector Level Sweep (SLS) of the beamforming procedure.

Example 24 includes the subject matter of any one of Examples 19-23, and optionally, wherein the first beamforming transmission is an Initiator Sector Sweep (ISS) and the second beamforming transmission is a responder Sector Sweep (RSS).

Example 25 includes the subject matter of any one of Examples 19-23, and optionally, wherein the first beamforming transmission is a responder Sector Sweep (RSS), and the second beamforming transmission is a Sector Sweep Feedback.

Example 26 includes the subject matter of any one of Examples 19-25, and optionally, wherein the first station is a Direct Multi Gigabit (DMG) station.

Example 27 includes a product including one or more tangible computer-readable non-transitory storage media comprising computer-executable instructions operable to, when executed by at least one computer processor, enable the at least one computer processor to implement a method at a first station, the method comprising transmitting to a second station a plurality of sector sweep (SSW) frames of a first beamforming transmission of a beamforming procedure, a SSW frame of the first beamforming transmission including a duration value to indicate a time until at least a beginning of a second beamforming transmission subsequent to the first beamforming transmission; and receiving from the second station one or more SSW frames of the second beamforming transmission.

Example 28 includes the subject matter of Example 27, and optionally, wherein the duration value indicates a time until an end of a first SSW frame in the second beamforming transmission.

Example 29 includes the subject matter of Example 27, and optionally, wherein the second beamforming transmission is separated from the first beamforming transmission by a Medium Beamforming Interframe Spacing (MBIFS) period, the duration value being based on a sum of a remaining time of the first beamforming transmission, and the MBIFS.

Example 30 includes the subject matter of Example 27, and optionally, wherein the second beamforming transmission is separated from the first beamforming transmission by a Medium Beamforming Interframe Spacing (MBIFS) period, the duration value being based on a sum of a remaining time of the first beamforming transmission, the MBIFS, and a transmission time of a first SSW frame in the second beamforming transmission.

Example 31 includes the subject matter of any one of Examples 27-30, and optionally, wherein the first beamforming transmission and the second beamforming transmission are part of a Sector Level Sweep (SLS) of the beamforming procedure.

Example 32 includes the subject matter of any one of Examples 27-31, and optionally, wherein the first beamforming transmission is an Initiator Sector Sweep (ISS) and the second beamforming transmission is a responder Sector Sweep (RSS).

Example 33 includes the subject matter of any one of Examples 27-31, and optionally, wherein the first beamforming transmission is a responder Sector Sweep (RSS), and the second beamforming transmission is a Sector Sweep Feedback.

Example 34 includes the subject matter of any one of Examples 27-33, and optionally, wherein the first station is a Direct Multi Gigabit (DMG) station.

Example 35 includes an apparatus of wireless communication, the apparatus comprising means for transmitting from a first station to a second station a plurality of sector sweep (SSW) frames of a first beamforming transmission of a beamforming procedure, a SSW frame of the first beamforming transmission including a duration value to indicate a time until at least a beginning of a second beamforming transmission subsequent to the first beamforming transmission; and means for receiving at the first station one or more SSW frames of the second beamforming transmission from the second station.

Example 36 includes the subject matter of Example 35, and optionally, wherein the duration value indicates a time until an end of a first SSW frame in the second beamforming transmission.

Example 37 includes the subject matter of Example 35, and optionally, wherein the second beamforming transmission is separated from the first beamforming transmission by a Medium Beamforming Interframe Spacing (MBIFS) period, the duration value being based on a sum of a remaining time of the first beamforming transmission, and the MBIFS.

Example 38 includes the subject matter of Example 35, and optionally, wherein the second beamforming transmission is separated from the first beamforming transmission by a Medium Beamforming Interframe Spacing (MBIFS) period, the duration value being based on a sum of a remaining time of the first beamforming transmission, the MBIFS, and a transmission time of a first SSW frame in the second beamforming transmission.

Example 39 includes the subject matter of any one of Examples 35-38, and optionally, wherein the first beamforming transmission and the second beamforming transmission are part of a Sector Level Sweep (SLS) of the beamforming procedure.

Example 40 includes the subject matter of any one of Examples 35-39, and optionally, wherein the first beamforming transmission is an Initiator Sector Sweep (ISS) and the second beamforming transmission is a responder Sector Sweep (RSS).

Example 41 includes the subject matter of any one of Examples 35-39, and optionally, wherein the first beamforming transmission is a responder Sector Sweep (RSS), and the second beamforming transmission is a Sector Sweep Feedback.

Example 42 includes the subject matter of any one of Examples 35-41, and optionally, wherein the first station is a Direct Multi Gigabit (DMG) station.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory and a processor configured to cause a beamforming initiator to:
   transmit a plurality of initiator Sector Sweep (SSW) frames to a beamforming responder during an Initiator Sector Sweep (ISS) of a Sector Level Sweep (SLS) phase, an initiator SSW frame of the plurality of initiator SSW frames comprising a duration field, the duration field comprising a duration value based on a sum of a time until an end of the ISS and a Medium Beamforming Interframe Space (MBIFS); and
   receive one or more responder SSW frames from the beamforming responder during a Responder Sector Sweep (RSS) of the SLS phase.

2. The apparatus of claim 1, wherein a beginning of the RSS is separated from the end of the ISS by the MBIFS.

3. The apparatus of claim 1, wherein the duration value is equal to the sum of the time until the end of the ISS and the MBIFS.

4. The apparatus of claim 1 configured to cause the beamforming initiator to set the duration field in the initiator SSW frame based on a sum of the MBIFS and a remaining time until an end of a last initiator SSW frame in the ISS.

5. The apparatus of claim 1 configured to cause the beamforming initiator to access a duration field in a responder SSW frame of the one or more responder SSW frames, the duration field in the responder SSW frame is based on a sum of a remaining time until an end of the RSS and the MBIFS.

6. The apparatus of claim 1 configured to cause the beamforming initiator to transmit an SSW feedback to the beamforming responder, the SSW feedback separated from the end of the RSS by the MBIFS.

7. The apparatus of claim 1, wherein the MBIFS is longer than a Short Interframe Space (SIFS).

8. The apparatus of claim 1 configured to cause the beamforming initiator to transmit the plurality of initiator SSW frames over a Directional Multi-Gigabit (DMG) frequency band.

9. The apparatus of claim 1 comprising a Medium Access Control (MAC), and a Physical Layer (PHY).

10. The apparatus of claim 1 comprising a radio.

11. The apparatus of claim 1 comprising one or more antennas.

12. A product comprising one or more tangible computer-readable non-transitory storage media comprising computer-executable instructions operable to, when executed by at least one processor, enable the at least one processor to cause a beamforming initiator to:
    transmit a plurality of initiator Sector Sweep (SSW) frames to a beamforming responder during an Initiator Sector Sweep (ISS) of a Sector Level Sweep (SLS) phase, an initiator SSW frame of the plurality of initiator SSW frames comprising a duration field, the duration field comprising a duration value based on a sum of a time until an end of the ISS and a Medium Beamforming Interframe Space (MBIFS); and
    receive one or more responder SSW frames from the beamforming responder during a Responder Sector Sweep (RSS) of the SLS phase.

13. The product of claim 12, wherein a beginning of the RSS is separated from the end of the ISS by the MBIFS.

14. The product of claim 12, wherein the duration value is equal to the sum of the time until the end of the ISS and the MBIFS.

15. The product of claim 12, wherein the instructions, when executed, cause the beamforming initiator to set the duration field in the initiator SSW frame based on a sum of the MBIFS and a remaining time until an end of a last initiator SSW frame in the ISS.

16. The product of claim 12, wherein the instructions, when executed, cause the beamforming initiator to access a duration field in a responder SSW frame of the one or more responder SSW frames, the duration field in the responder SSW frame is based on a sum of a remaining time until an end of the RSS and the MBIFS.

17. The product of claim 12, wherein the instructions, when executed, cause the beamforming initiator to transmit an SSW feedback to the beamforming responder, the SSW feedback separated from the end of the RSS by the MBIFS.

18. The product of claim 12, wherein the MBIFS is longer than a Short Interframe Space (SIFS).

19. The product of claim 12, wherein the instructions, when executed, cause the beamforming initiator to transmit the plurality of initiator SSW frames over a Directional Multi-Gigabit (DMG) frequency band.

20. An apparatus comprising a memory and a processor configured to cause a beamforming responder to:
   transmit a plurality of responder Sector Sweep (SSW) frames to a beamforming initiator during a Responder Sector Sweep (RSS) of a Sector Level Sweep (SLS) phase, a responder SSW frame of the plurality of responder SSW frames comprising a duration field, the duration field comprising a duration value based on a sum of a time until an end of the RSS and a Medium Beamforming Interframe Space (MBIFS); and
   receive an SSW feedback frame from the beamforming initiator after the RSS.

21. The apparatus of claim 20, wherein the SSW feedback frame is separated from the end of the RSS by the MBIFS.

22. The apparatus of claim 20, wherein the duration value is equal to the sum of the time until the end of the RSS and the MBIFS.

23. The apparatus of claim 20 configured to cause the beamforming responder to set the duration field in the responder SSW frame based on a sum of the MBIFS and a remaining time until an end of a last responder SSW frame in the RSS.

24. The apparatus of claim 20 configured to cause the beamforming responder to receive one or more initiator SSW frames from the beamforming initiator during an Initiator Sector Sweep (ISS) of the SLS phase, the RSS is after the ISS.

25. The apparatus of claim 24 configured to cause the beamforming responder to access a duration field in an initiator SSW frame of the one or more initiator SSW frames, the duration field in the initiator SSW frame is based on a sum of a remaining time until an end of the ISS and the MBIFS.

26. The apparatus of claim 20, wherein the MBIFS is longer than a Short Interframe Space (SIFS).

27. The apparatus of claim 20 configured to cause the beamforming responder to transmit the plurality of responder SSW frames over a Directional Multi-Gigabit (DMG) frequency band.

28. The apparatus of claim 20 comprising a Medium Access Control (MAC), and a Physical Layer (PHY).

29. The apparatus of claim 20 comprising a radio.

30. The apparatus of claim 20 comprising one or more antennas.

31. A product comprising one or more tangible computer-readable non-transitory storage media comprising computer-executable instructions operable to, when executed by at least one processor, enable the at least one processor to cause a beamforming responder to:
   transmit a plurality of responder Sector Sweep (SSW) frames to a beamforming initiator during a Responder Sector Sweep (RSS) of a Sector Level Sweep (SLS) phase, a responder SSW frame of the plurality of responder SSW frames comprising a duration field, the duration field comprising a duration value based on a sum of a time until an end of the RSS and a Medium Beamforming Interframe Space (MBIFS); and
   receive an SSW feedback frame from the beamforming initiator after the RSS.

32. The product of claim 31, wherein the SSW feedback frame is separated from the end of the RSS by the MBIFS.

33. The product of claim 31, wherein the duration value is equal to the sum of the time until the end of the RSS and the MBIFS.

34. The product of claim 31, wherein the instructions, when executed, cause the beamforming responder to set the duration field in the responder SSW frame based on a sum of the MBIFS and a remaining time until an end of a last responder SSW frame in the RSS.

35. The product of claim 31, wherein the instructions, when executed, cause the beamforming responder to receive one or more initiator SSW frames from the beamforming initiator during an Initiator Sector Sweep (ISS) of the SLS phase, the RSS is after the ISS.

36. The product of claim 35, wherein the instructions, when executed, cause the beamforming responder to access a duration field in an initiator SSW frame of the one or more initiator SSW frames, the duration field in the initiator SSW frame is based on a sum of a remaining time until an end of the ISS and the MBIFS.

37. The product of claim 31, wherein the MBIFS is longer than a Short Interframe Space (SIFS).

38. The product of claim 31, wherein the instructions, when executed, cause the beamforming responder to transmit the plurality of responder SSW frames over a Directional Multi-Gigabit (DMG) frequency band.

* * * * *